United States Patent
Ohayon

[19]

[11] Patent Number: 5,922,940
[45] Date of Patent: Jul. 13, 1999

[54] BAROMETRIC AND ALTIMETER BOMB DETECTION AND MIDAIR EXPLOSION AVOIDANCE SYSTEM FOR AIRPLANES

[76] Inventor: Shalom Ohayon, 2305 60th St., Brooklyn, N.Y. 11204

[21] Appl. No.: 09/054,959

[22] Filed: Apr. 3, 1998

Related U.S. Application Data

[62] Division of application No. 08/689,379, Aug. 8, 1996.

[51] Int. Cl.⁶ .................................................. G01N 33/22
[52] U.S. Cl. ........................................ 73/35.17; 73/35.14
[58] Field of Search .................................... 86/50; 89/1.1; 73/864.51, 865.6, 35.14, 35.17, 865.8, 167; 206/205, 213.1, 525, 527; 220/1.5, 1.6, 88.3; 454/77

[56] References Cited

U.S. PATENT DOCUMENTS

| | | |
|---|---|---|
| 2,501,898 | 3/1950 | Haggerty . |
| 2,511,877 | 6/1950 | Protzeller . |
| 2,861,699 | 11/1958 | Youmans ..................................... 214/1 |
| 2,917,927 | 12/1959 | Clark .................................. 73/35.17 X |
| 2,956,585 | 10/1960 | Alsworth et al. . |
| 3,820,435 | 6/1974 | Rogers et al. ............................. 89/1 R |
| 4,474,052 | 10/1984 | Bodurtha, Jr. et al. ................. 73/35.17 |
| 4,901,538 | 2/1990 | Anthony . |
| 5,274,356 | 12/1993 | Taricco .................................... 340/515 |
| 5,327,744 | 7/1994 | Frawley et al. . |

*Primary Examiner*—Elizabeth L. Dougherty
*Attorney, Agent, or Firm*—Ostrolenk, Faber, Gerb & Soffen, LLP

[57] ABSTRACT

A barometric and altitude bomb detector and midair explosion avoidance system has reinforced armored chamber for containing air travel passenger luggage which is capable of regulating the atmospheric pressure within the chamber. The present invention is designed to track and safely activate bombs that operate according to barometric and altimeter triggering systems by regulating the atmospheric pressure inside the chamber to a similar atmospheric pressure which exists at high altitude (or to air pressure which exist in intercontinental air travel or during climb up), such that the bomb's barometric or altimeter triggering device, which are sensitive to high altitude atmospheric pressures, will move a diaphragm which pushes a switch connected to a battery and which by electric charge blasts the cap and detonates the bomb. The chamber, is capable on the same principal, to detect an altimeter bomb hidden in luggage, by applying low and appropriate atmospheric pressure to the luggage such that the bomb's triggering system will be activated and the bomb will explode safely on the ground (i.e., before boarding the airplane cargo hold or the passenger cabin). In addition, the chamber includes a camera which will video tape the test inside the chamber, pinpointing and identifying the exact location of the bomb and the luggage that carried the bomb. To ensure that a bomb which is connected to a timer and a barometric triggering device will not escape detection on the ground and be set off in flight, the cargo will be placed inside a pressurized cargo hold an atmospheric pressure maintained at a similar or higher level than ground pressure. Thus, the diaphragm of the bomb triggering device will be prevented from moving and blasting the bomb-cap. this method of handling cargo has an important role in countering terrorism if a bomb has bypassed the atmospheric test on the ground.

3 Claims, 2 Drawing Sheets

BAROMETRIC AND ALTIMETER BOMB DETECTION AND MIDAIR EXPLOSION AVOIDANCE SYSTEM FOR AIRPLANES

This is a division of application Ser. No. 08/689,379, filed Aug. 8, 1996 pending.

BACKGROUND OF THE INVENTION

1. Field of the Invention

The present invention relates to an antiterrorist bomb detecting device for airport terminals.

2. Related Art

Currently air travel is a major target for terrorist bombings. This is so because of the high casualties involved and the paralyzing effect terrorism has on the airline industry, worldwide.

Domestically, as well as in other countries, airports are not equipped with adequate bomb detecting machines to protect passengers and airplanes. Indeed, there are still many penetrable airports in which terrorists may plant a bomb inside airplanes. Furthermore, explosive sniffing dogs and machines for detecting bombs can fail to detect such bombs.

To provide safer air travel, the present invention will test, track and safely activate on the ground, all barometric and altitude bombs before boarding the airplane cargo hold. The process of the present invention takes only a few minutes and does not introduce major delays to flights.

SUMMARY OF THE INVENTION

Accordingly, it is an object of the invention to provide safer air travel and to counter terrorism by adding a safety barrier against the introduction of barometric and altitude bombs into airplanes. These and other objects will become apparent to those skilled in the art from the instant disclosure.

One feature of the present invention resides in an antiterrorist bomb detecting device which includes an armored chamber located in a protected luggage check-in point in an airport terminal. The device is equipped with a decompression device for gradually regulating the chamber's cabin atmospheric pressure, such that an airplane's climb-up cargo pressure is simulated. As the chamber's atmospheric pressure is reduced closer to the bomb triggering device's threshold point, the bomb's barometric detonating device will be activated and the bomb will be set off. This is so because as the chamber's space is exhausted of air, a diaphragm of the bomb's triggering device will move a switch and release a trigger of a blasting cap. This results in the safe detonation of the bomb on the ground.

The present invention will also safely activate altimeter bombs on the ground by gradually reducing the chamber's atmospheric pressure to simulate the airplane climb-up pressure as applied to luggage inside the chamber, the luggage being a vehicle for potentially carrying a terrorist bomb. Alternatively, the invention may simply subject the luggage to the same pressure condition which exists at high altitudes (although the luggage remains on the ground within the chamber), until the sensitive point of the altimeter releases the bomb's trigger. This results in the safe detonation of the bomb on the ground, before loading the airplane cargo-hold, and the process takes only a few minutes.

Among the advantages of the present invention are that it provides a means for safer air travel while also reducing time delays caused by security procedures when passengers are boarding airplanes.

The novel features which are considered as characteristic of the invention are set forth in particular in the appended claims and will be apparent by a careful reading of the specification and accompanying drawings.

DESCRIPTION OF THE PREFERRED EMBODIMENTS

Figure 1:
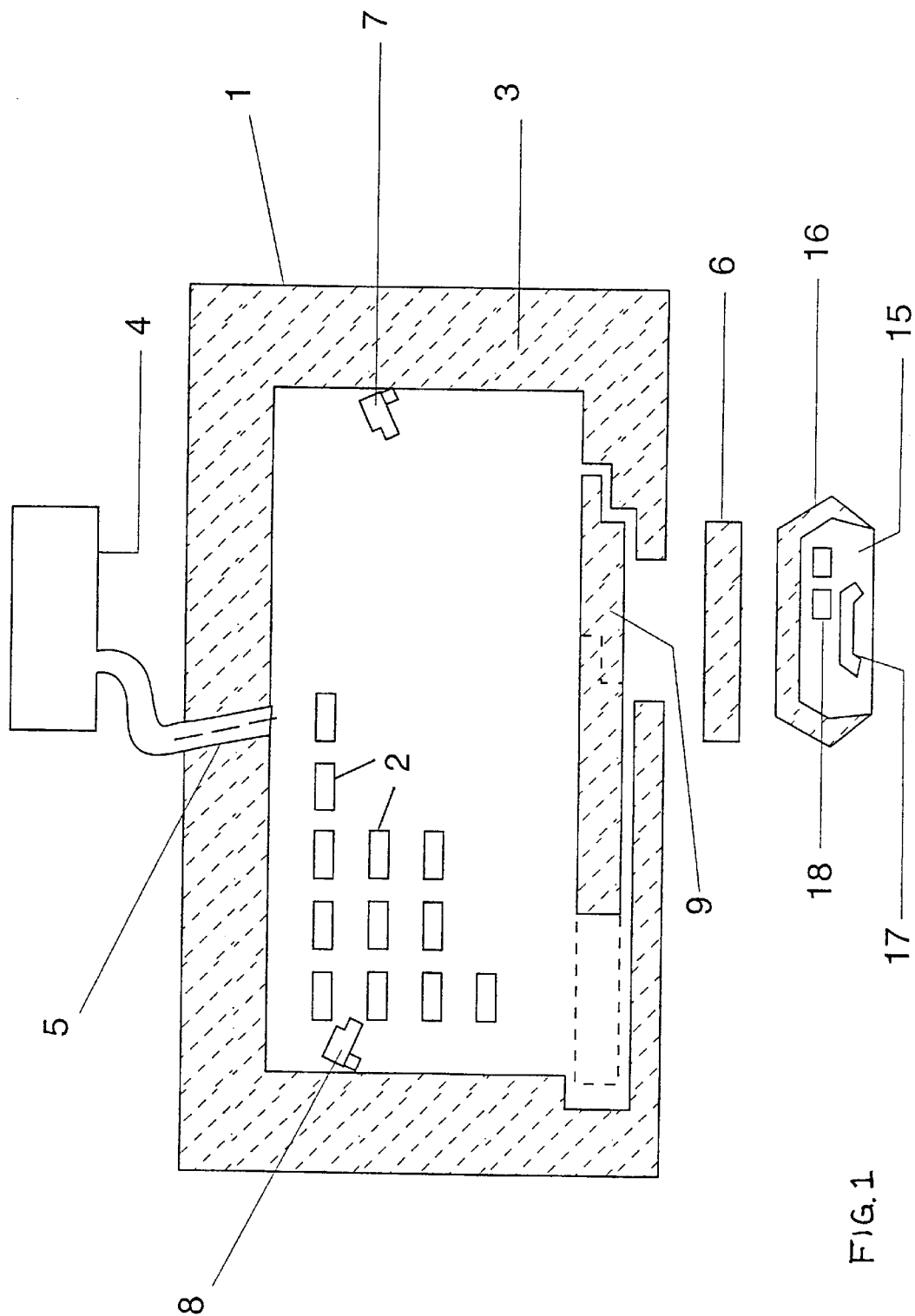
FIG. 1 is a top view of the armored decompression chamber for detecting barometric and altitude bombs in accordance with the invention.

Referring to the drawing wherein like numerals indicate like elements, there is shown in FIG. 1 a barometric and altitude bomb detection and midair explosion avoidance system which is preferably located on the ground. The system includes an armored chamber which is identified with reference numeral 1. The chamber 1 is preferably positioned inside an airport terminal nearby a luggage check-in point and in a well protected area. The chamber 1 is constructed of reinforced (e.g., heavy metal) walls 3 which can safely withstand the force of a bomb blast (or explosion) within the airline terminal.

The chamber 1 has a reinforced metal door 9 (e.g. an armored door) which provides a hermetically sealed environment for exhausting air from the chamber 1. The sealed environment is not subject to outside atmospheric pressure. A control room 15 is provided which includes video monitors 18 and a control board 17. The control room 15 preferably also includes a reinforced protection wall 16 and, for added safety, the control room 15 is located behind a door blast protection wall 6.

Video cameras 7, 8 are located within the chamber 1 and communicate with the video monitors 18 to pinpoint the location of the luggage 2 (if any) which contains a bomb. The video cameras 7, 8 also provide for videotaping.

A decompression system 4 communicates with the chamber 1 through an air exhaustion outlet 5. The decompression system 4 is coupled to the control board 17 such that the atmospheric pressure within the chamber 1 is regulated to the pressure that exists at high altitudes, for example, at least up to a 45,000 ft altitude, which will set off the barometric triggering device in a piece of luggage containing a bomb. Preferably, the decompression unit 4 exhausts the air gradually to simulate an airplane atmospheric pressure and barometric pressure profile as it climbs to high altitude. This normally will set off the bomb.

Figure 2:
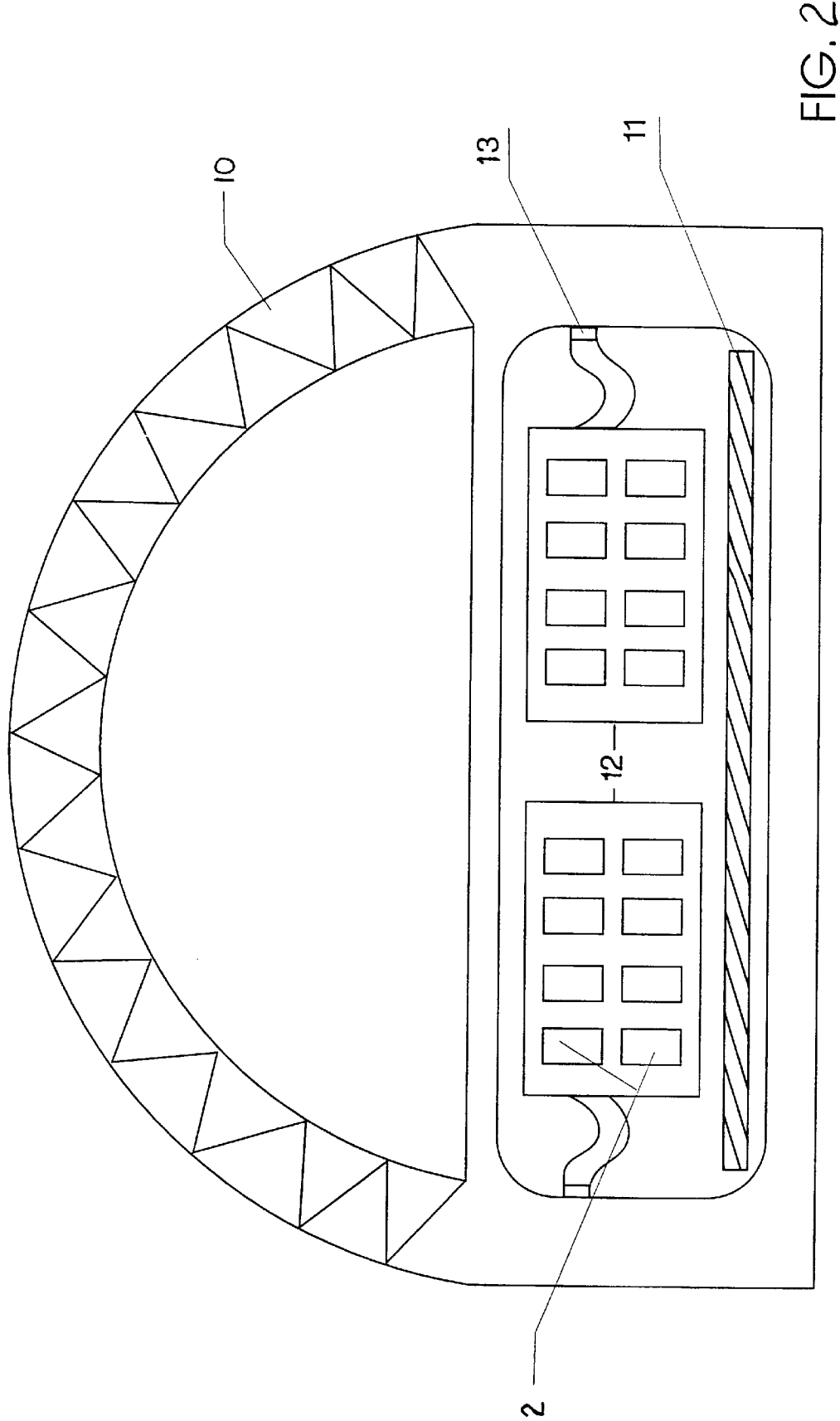
FIG. 2 is a view of an airplane fuselage in accordance with the invention.

Reference is now made to FIG. 2 which is a side view of an airplane fuselage 10 and cargo hold 11. According to the invention, cargo (or luggage) containers 12 are pressurized via connections 13 to the airplane's pressurizing system. After a ground test for bombs is complete, the luggage (or cargo) 2 is placed into the containers 12 which are automatically maintained at substantially the same atmospheric pressure which exists on the ground (and maybe higher than on the ground). Thus, the diaphragm of the bomb trigger is held in place via air pressure and will not move and set off the bomb in flight.

The purpose of this luggage storing apparatus and method is to ensure safe flight even if the bomb detector on the ground fails to detect the bomb before boarding the airplane cargo hold. In particular, if a timer is connected to the barometric trigger of the bomb for delaying its operation during ground testing in the chamber, the pressure within the container 12 will prevent the detonation of the bomb during flight.

What is claimed is:

1. A bomb avoidance apparatus, comprising:

a container sized and shaped to hold aircraft cargo, and for being located in a cargo hold of an aircraft; and a pressure connector coupled to the container for permitting communication between the container and a pressurizing system on the aircraft, the pressure connector for providing pressurized gas into the container such that a triggering device of a barometric and altitude bomb will not trigger when placed in the container and the pressure of the cargo hold decreases.

2. The bomb avoidance apparatus of claim 1, wherein the pressurizing system on the aircraft maintains the pressure within the container at a level which is substantially the same as pressure existing in the cargo hold when the aircraft is grounded.

3. The bomb avoidance apparatus of claim 1, wherein the pressurizing system on the aircraft maintains the pressure within the container at a level which is higher than pressure existing in the cargo hold when the aircraft is grounded.

* * * * *